(12) United States Patent
Li et al.

(10) Patent No.: US 10,958,438 B2
(45) Date of Patent: Mar. 23, 2021

(54) METHOD, APPARATUS, AND ELECTRONIC DEVICE FOR BLOCKCHAIN-BASED RECORDKEEPING

(71) Applicant: ADVANCED NEW TECHNOLOGIES CO., LTD., Grand Cayman (KY)

(72) Inventors: Fuqiang Li, Hangzhou (CN); Linqing Wang, Hangzhou (CN); Hong Zhang, Hangzhou (CN); Haitao Jiang, Hangzhou (CN); Xinyu Weng, Hangzhou (CN); Zongru Zhan, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 15/931,909

(22) Filed: May 14, 2020

(65) Prior Publication Data

US 2020/0274715 A1    Aug. 27, 2020

Related U.S. Application Data

(63) Continuation of application No. 16/661,735, filed on Oct. 23, 2019.

(30) Foreign Application Priority Data

Oct. 31, 2018 (CN) .......................... 201811289523.7

(51) Int. Cl.
*H04L 29/06* (2006.01)
*H04L 9/32* (2006.01)
(Continued)

(52) U.S. Cl.
CPC ....... *H04L 9/3247* (2013.01); *G06Q 20/3829* (2013.01); *H04L 9/0637* (2013.01); *H04L 9/3239* (2013.01); *H04L 2209/38* (2013.01)

(58) Field of Classification Search
CPC . H04L 2209/38; H04L 9/3239; H04L 9/3247; H04L 9/0643; H04L 9/3236
See application file for complete search history.

(56) References Cited

U.S. PATENT DOCUMENTS

| 9,876,775 | B2 | 1/2018 | Mossbarger |
| 10,102,265 | B1 | 10/2018 | Madisetti et al. |

(Continued)

FOREIGN PATENT DOCUMENTS

| CN | 106503995 A | 3/2017 |
| CN | 107659410 A | 2/2018 |

(Continued)

OTHER PUBLICATIONS

Bela Gipp et al., Securing Video Integrity Using Decentralized Trusted Timestamping on the Bitcoin Blockchain, Sep. 2016, AIS Electronic Library (AISeL), pp. 1-11. (Year: 2016).*

(Continued)

*Primary Examiner* — Luu T Pham
*Assistant Examiner* — Fahimeh Mohammadi

(57) ABSTRACT

A method for blockchain-based data verification is provided. The method includes: obtaining target data submitted by a data submitter, wherein a first data digest of the target data is recorded in a blockchain; computing a second data digest of the target data; determining whether the second data digest matches the first data digest of the target data recorded in the blockchain; and determining that the target data submitted by the data submitter is valid in response to determining that the second data digest matches the first data digest of the target data recorded in the blockchain.

20 Claims, 2 Drawing Sheets

(51) Int. Cl.
*G06Q 20/38* (2012.01)
*H04L 9/06* (2006.01)

(56) References Cited

U.S. PATENT DOCUMENTS

| | | | |
|---|---|---|---|
| 10,102,526 B1 | 10/2018 | Madisetti et al. | |
| 10,504,179 B1* | 12/2019 | McGuire | G06Q 40/04 |
| 2002/0194209 A1* | 12/2002 | Bolosky | G06F 16/137 |
| 2003/0212893 A1* | 11/2003 | Hind | H04L 9/3247 |
| | | | 713/177 |
| 2005/0255154 A1* | 11/2005 | Pereswetoff-Morath | |
| | | | A61K 9/0048 |
| | | | 424/450 |
| 2009/0106451 A1* | 4/2009 | Zuckerman | H04L 29/08333 |
| | | | 709/239 |
| 2012/0124381 A1* | 5/2012 | Kim | H04L 9/3242 |
| | | | 713/176 |
| 2016/0275461 A1* | 9/2016 | Sprague | G06Q 20/0655 |
| 2017/0046693 A1 | 2/2017 | Haldenby et al. | |
| 2017/0091467 A1 | 3/2017 | Pogorelik et al. | |
| 2017/0180134 A1* | 6/2017 | King | H04L 63/0853 |
| 2017/0257358 A1* | 9/2017 | Ebrahimi | H04L 9/3247 |
| 2017/0331896 A1 | 11/2017 | Holloway et al. | |
| 2017/0338967 A1 | 11/2017 | Lewison et al. | |
| 2018/0018738 A1 | 1/2018 | Bernauer et al. | |
| 2018/0068091 A1* | 3/2018 | Gaidar | G06F 21/16 |
| 2018/0121935 A1* | 5/2018 | Mori | G06Q 30/02 |
| 2018/0158162 A1 | 6/2018 | Ramasamy | |
| 2018/0216946 A1 | 8/2018 | Gueye | |
| 2018/0219685 A1 | 8/2018 | Deery et al. | |
| 2018/0225448 A1* | 8/2018 | Russinovich | H04L 9/3265 |
| 2018/0225661 A1* | 8/2018 | Russinovich | H04L 63/08 |
| 2018/0240107 A1 | 8/2018 | Andrade | |
| 2018/0240170 A1 | 8/2018 | Andrade | |
| 2019/0013934 A1* | 1/2019 | Mercuri | H04L 9/0637 |
| 2019/0013943 A1 | 1/2019 | Maim | |
| 2020/0028691 A1* | 1/2020 | Rao | G06F 8/658 |

FOREIGN PATENT DOCUMENTS

| | | | |
|---|---|---|---|
| CN | 107888375 A | | 4/2018 |
| CN | 108512653 A | | 9/2018 |
| CN | 108667811 A | | 10/2018 |
| CN | 108717431 A | | 10/2018 |
| WO | 2017090041 A1 | | 6/2017 |
| WO | 2017122187 A1 | | 7/2017 |
| WO | WO 2019/084908 | * | 11/2017 |
| WO | 2018007828 A2 | | 1/2018 |
| WO | 2018025028 A1 | | 2/2018 |
| WO | 2018125989 A2 | | 7/2018 |
| WO | 2018131004 A2 | | 7/2018 |

OTHER PUBLICATIONS

Chinnapong Angsuchotmetee et al., VoDCoin: A Cryptocurrency-Based Architecture for a Decentralized-Based Video-on-Demand Service, Sep. 2018, ACM, pp. 100-105. (Year: 2018).*
Pierluigi Gallo et al., BlockSee: Blockchain for IoT video surveillance in smart cities, Jun. 12-15, 2018, IEEE, pp. 1-6. (Year: 2018).*
Michael Pramatejakis et al., Authentication of MPEC-Cbased Surveillance Video, Oct. 24-27, 2004, IEEE, pp. 33-37. (Year: 2004).*
International Search Report and Written Opinion for Application No. PCT/US2019/057688, dated Feb. 3, 2020.
Anonymous, "Securing data in the TEE—SecSign 2FA", Jan. 2, 2017.
Anonymous, "Transaction", Ethereum book, Oct. 11, 2018.
Miguelmota, "docstampil.it", May 5, 2018.
Miguelmota, "DocStamp.sol," Nov. 12, 2017.
First Search for Chinese Application No. 201811289523.7 dated Jun. 4, 2020.
Search Report for Taiwanese Application No. 108122848 dated Dec. 2, 2020.
Written Opinion for PCT Application No. PCT/US2019/057688 dated Oct. 30, 2020.

* cited by examiner

US 10,958,438 B2

METHOD, APPARATUS, AND ELECTRONIC DEVICE FOR BLOCKCHAIN-BASED RECORDKEEPING

CROSS REFERENCE TO RELATED APPLICATION

This application is a continuation of U.S. application Ser. No. 16/661,735, filed Oct. 23, 2019, and titled "Method, Apparatus, and Electronic Device For Blockchain-Based Recordkeeping," which claims priority to the Chinese patent application No. 201811289523.7 filed on Oct. 31, 2018, and entitled "Method, Apparatus, and Electronic Device For Blockchain-Based Recordkeeping." All of the above applications are incorporated herein by reference in their entirety.

TECHNICAL FIELD

One or more embodiments of the application relate to the field of blockchain technologies, and in particular, to a method, apparatus, and electronic device for blockchain-based recordkeeping.

BACKGROUND

Blockchain, also known as a distributed ledger technology, is an emerging technology in which multiple computing devices participate in "accounting" to maintain a complete distributed database jointly. The blockchain technology is decentralized and transparent, each computing device can participate in maintaining records in the database, and data can be quickly synchronized among the computing devices. With the aforementioned characteristics, the blockchain technology has been widely applied in many fields.

SUMMARY

This specification provides a method for blockchain-based data verification, and the method may include: obtaining target data submitted by a data submitter, wherein a first data digest of the target data is recorded in a blockchain; computing a second data digest of the target data; determining whether the second data digest matches the first data digest of the target data recorded in the blockchain; and determining that the target data submitted by the data submitter is valid in response to determining that the second data digest matches the first data digest of the target data recorded in the blockchain.

In some embodiments, the method may further comprise: determining that the target data submitted by the data submitter is invalid in response to determining that the second data digest does not match the first data digest of the target data recorded in the blockchain.

In some embodiments, the target data is acquired by a terminal device, the terminal device comprises a secure operation environment, and a private key of the terminal device is stored in the secure operation environment.

In some embodiments, the method may further comprise: obtaining the first data digest of the target data submitted by the terminal device to the blockchain, wherein the first data digest is signed in the secure operation environment based on the private key of the terminal device to generate a signature; the signature of the first data digest is verified based on a public key corresponding to the private key; and the first data digest of the target data is recorded in the blockchain in response to the signature being verified to be valid.

In some embodiments, the terminal device comprises a body worn camera or an event data recorder. In some embodiments, the target data comprises video data, audio data, or image data, or a combination thereof, which is acquired by the body worn camera or the event data recorder.

In some embodiments, determining whether the second data digest matches the first data digest of the target data recorded in the blockchain comprises: verifying whether the second data digest has been recorded in the blockchain; and determining that the second data digest matches the first data digest of the target data recorded in the blockchain in response to verifying that the second data digest has been recorded in the blockchain.

In some embodiments, determining whether the second data digest matches the first data digest of the target data recorded in the blockchain further comprises: determining that the second data digest does not match the first data digest of the target data recorded in the blockchain in response to verifying that the second data digest has not been recorded in the blockchain.

In some embodiments, determining whether the second data digest matches the first data digest of the target data recorded in the blockchain comprises: obtaining the first data digest of the target data recorded in the blockchain; determining whether the first data digest of the target data is the same as the second data digest; and determining that the second data digest matches the first data digest of the target data recorded in the blockchain in response to determining that the first data digest of the target data is the same as the second data digest.

In some embodiments, determining whether the second data digest matches the first data digest of the target data recorded in the blockchain further comprises: determining that the second data digest does not match the first data digest of the target data recorded in the blockchain in response to determining that the first data digest of the target data is different from the second data digest.

In some embodiments, description data of the target data is recorded in the blockchain; and determining that the target data submitted by the data submitter is valid in response to determining that the second data digest matches the first data digest of the target data recorded in the blockchain comprises: in response to determining that the second data digest matches the first data digest of the target data recorded in the blockchain, determining whether description data of the target data submitted by the data submitter matches the description data of the target data recorded in the blockchain; and determining that the target data submitted by the data submitter is valid in response to determining that the description data of the target data submitted by the data submitter matches the description data of the target data recorded in the blockchain.

In some embodiments, the description data comprises: an acquisition time of the target data, an acquisition location of the target data, or an object related to the target data, or a combination thereof.

This specification further provides an apparatus for blockchain-based data verification, and the apparatus may include: one or more processors and one or more non-transitory computer-readable memories coupled to the one or more processors and configured with instructions executable by the one or more processors to cause the apparatus to perform operations comprising: obtaining target data submitted by a data submitter, wherein a first data digest of the target data is recorded in a blockchain; computing a second data digest of the target data; determining whether the second data digest matches the first data digest of the target data recorded in the blockchain; and determining that the target data submitted by the data submitter is valid in response to determining that the second data digest matches the first data digest of the target data recorded in the blockchain.

This specification further provides a non-transitory computer-readable storage medium. The non-transitory computer-readable storage medium may be configured with instructions executable by one or more processors to cause the one or more processors to perform operations comprising: one or more processors and one or more non-transitory computer-readable memories coupled to the one or more processors and configured with instructions executable by the one or more processors to cause the apparatus to perform operations comprising: obtaining target data submitted by a data submitter, wherein a first data digest of the target data is recorded in a blockchain; computing a second data digest of the target data; determining whether the second data digest matches the first data digest of the target data recorded in the blockchain; and determining that the target data submitted by the data submitter is valid in response to determining that the second data digest matches the first data digest of the target data recorded in the blockchain.

In the foregoing technical solutions, in one aspect, by improving the process of recordkeeping on the blockchain, the terminal device may no longer needs to record original content of acquired data on the blockchain; instead, the terminal device locally stores the original content of the acquired data, and records a data digest of the original content on the blockchain, so that the terminal device can be used as a hub between a physical world and a world on chain, and the acquired data is recorded on the blockchain more conveniently.

In another aspect, for a data verification party that obtains data acquired by the terminal device, the data verification party can conveniently verify the validity of the obtained data by matching a data digest of the obtained data with the data digest of the data which is recorded on the blockchain. Therefore, the data acquired by the terminal device can be submitted to the data verification party as proof or evidence, thereby greatly improving the usability of the data acquired by the terminal device.

DETAILED DESCRIPTION

Figure 1:
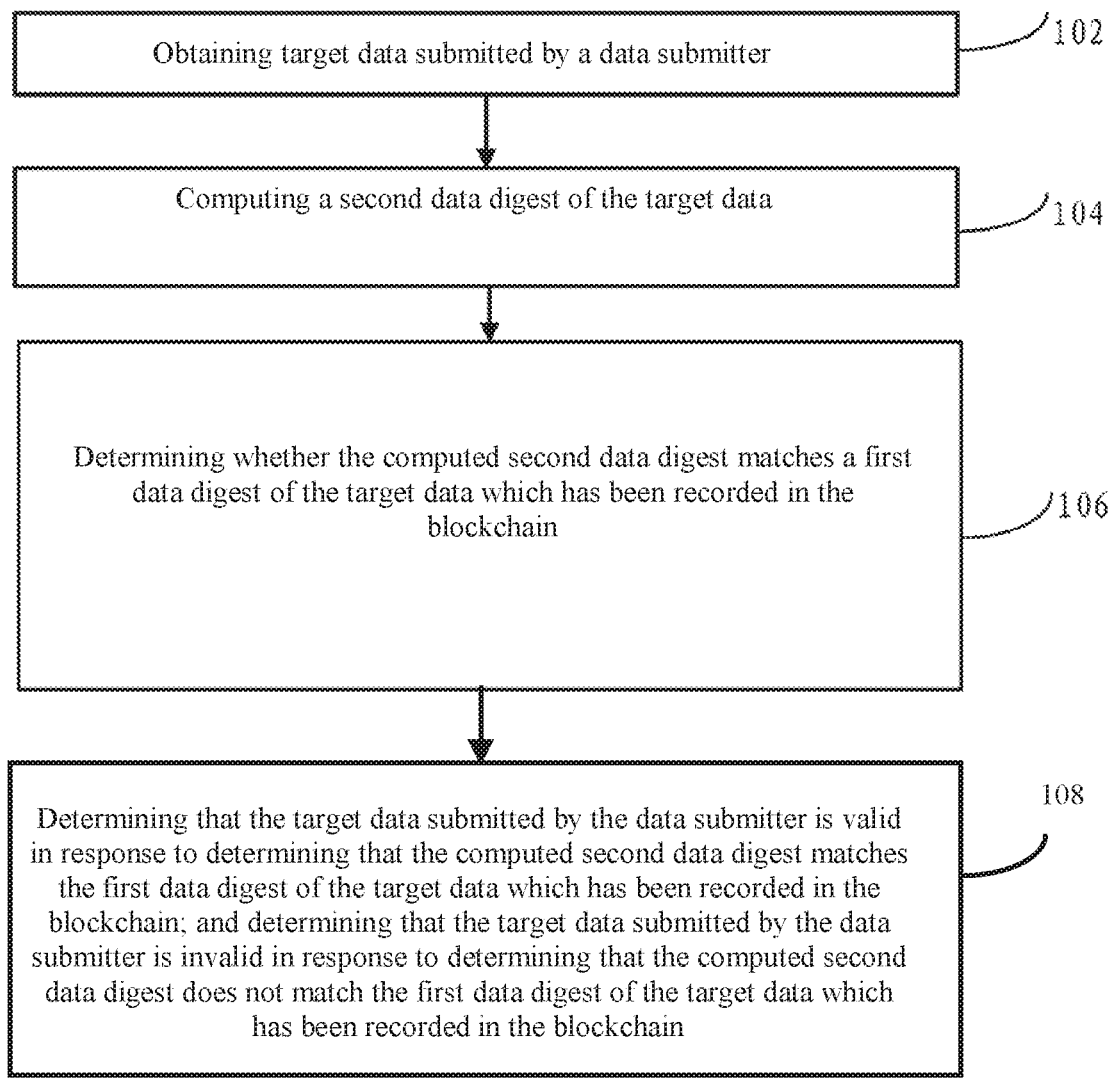
FIG. 1 is a flowchart of a method for blockchain-based recordkeeping according to some embodiments.

Because data stored on a blockchain cannot be tampered with, storing data on a blockchain for recordkeeping is a dominant trend in the industry at present.

However, in actual applications, some stream data, such as video stream and audio stream acquired by a body-worn camera or an event data recorder, may occupy a relatively large storage space, and therefore usually cannot be directly stored on the blockchain for recordkeeping.

However, in some scenarios, there is a strong demand to record such stream data. For example, in a judicial recordkeeping scenario, video stream acquired by a body-worn camera or an event data recorder may be submitted as proof or evidence to a judicial department.

Due to the lack of data authentication means, usually, the validity of such stream data as proof or evidence is widely questioned. Therefore, the best processing manner for such stream data is to store the data on the blockchain for recordkeeping. Moreover, storing data on blockchain for recordkeeping also makes it more convenient to verify the validity of the recorded data as judicial proof or evidence.

This specification provides embodiments in which a terminal device is used as a hub between a physical world and a world on the blockchain, so that data acquired by the terminal device is recorded on a blockchain more conveniently; and the validity of the recorded data is verified quickly.

During implementation, after acquiring data to be recorded on a blockchain, the terminal device may store the acquired data locally, compute a data digest of the acquired data, and then submit the computed data digest of the data to the blockchain for recordkeeping in the blockchain.

For example, a hardware environment of the terminal device may be improved. A secure operation environment is set up in the hardware environment of the terminal device, and a private key corresponding to the terminal device is stored and maintained in the secure operation environment. After computing a data digest of acquired data, the terminal device may sign the computed data digest in the secure operation environment based on the private key of the terminal device to generate a signature, and then submit the signed data digest along with the signature to the blockchain. After receiving the signed data digest submitted by the terminal device, a node in the blockchain may obtain a public key corresponding to the private key of the terminal device, and then verify the signature of the data digest based on the public key; if the signature is verified to be valid, the data digest may be stored in the blockchain for recordkeeping.

After the terminal device completes recordkeeping of the acquired data on the blockchain, a data submitter/provider may submit original content of the data, which is locally stored on the terminal device, to a data verification party as proof or evidence.

After receiving the data submitted by the data provider, the data verification party computes a data digest of the data, and determines whether the computed data digest matches the data digest of the data which has been recorded in the blockchain for recordkeeping.

If the computed data digest matches the data digest of the data which has been recorded in the blockchain, the data verification party can determine that the data submitted by the data submitter is valid data; on the contrary, if the computed data digest does not match the data digest of the data which has been recorded in the blockchain, the data verification party can determine that the data submitted by the data submitter is invalid data.

In the foregoing embodiments, in one aspect, by improving the process of recordkeeping on the blockchain, the terminal device may no longer need to record original content of acquired data on the blockchain; instead, the terminal device may locally store the original content of the acquired data, and record a data digest of the original content on the blockchain, so that the terminal device can be used as a hub between a physical world and a world on the blockchain, and the acquired data is recorded on the blockchain more conveniently.

In another aspect, for a data verification party that obtains data acquired by the terminal device, the data verification party can conveniently verify the validity of the obtained data by matching a data digest of the obtained data with a data digest of the data which has been recorded on the blockchain. Therefore, the data acquired by the terminal device can be submitted to the data verification party as proof or evidence, thereby greatly improving the usability of the data acquired by the terminal device.

Referring to FIG. 1, FIG. 1 shows a method for blockchain-based recordkeeping according to some embodiments of this specification. The method is implementable by a data verification party, where a first data digest of target data acquired by a terminal device is recorded in the blockchain. The following steps are performed according to the method.

Step 102: Obtaining target data submitted by a data submitter.

Step 104: Computing a second data digest of the target data.

Step 106: Determining whether the computed second data digest matches the first data digest of the target data which has been recorded in the blockchain.

Step 108: Determining that the target data submitted by the data submitter is valid in response to determining that the computed second data digest matches the first data digest of the target data which has been recorded in the blockchain; and determining that the target data submitted by the data submitter is invalid in response to determining that the computed second data digest does not match the first data digest of the target data which has been recorded in the blockchain.

In some embodiments, the blockchain described may be a private blockchain, a public blockchain, a consortium blockchain, or the like. Alternatively, other types of blockchain may also be used.

For example, the blockchain may be a consortium blockchain having the following member devices: a server of a third-party payment platform, a domestic bank server, an offshore bank server, and multiple user nodes. An entity operating the consortium blockchain may deploy online services such as consortium-blockchain-based cross-border account transfer and asset transfer.

In some embodiments, the terminal device may be any form of terminal device that can be added to the blockchain network as a node and can submit acquired data to the blockchain for recordkeeping. For example, the terminal device may include a body-worn camera, an event data recorder, or the like. The body-worn camera or the event data recorder may be added to the blockchain network as a node and submit acquired stream data, such as video data and audio data, to the blockchain for recordkeeping.

Recording data on the blockchain for recordkeeping may include permanently storing the data as proof or evidence on the blockchain.

In some embodiments, the target data may be any type of data that can be acquired by the terminal device and can be recorded in a distributed database of the blockchain network. For example, the target data may be stream data, such as video data, audio data, and image stream data, acquired by a terminal device such as a body-worn camera or an event data recorder.

In some embodiments, a hardware environment of the terminal device may be improved. A secure operation environment is set up in the hardware environment of the terminal device, and a private key corresponding to the terminal device is stored and maintained in the secure operation environment. The secure operation environment is provided for the terminal device.

Different manners may be used to set up the secure operation environment in the hardware environment of the terminal device.

For example, the secure operation environment may be set up by introducing new hardware to the hardware environment of the terminal device, or the secure operation environment may be set up by improving a software environment of existing hardware in the hardware environment of the terminal device. Alternatively, the secure operation environment may be set up by both introducing new hardware to the hardware environment of the terminal device and improving a software environment of existing hardware in the hardware environment of the terminal device.

For example, a secure operation environment may be set up for the terminal device based on a secure element (SE). For example, SE hardware may be introduced to the hardware environment of the terminal device. The SE hardware may be built-in hardware in the hardware environment of the terminal device, or may be external hardware connected to the terminal device through an interface. The private key corresponding to the terminal device is stored and maintained by using the SE hardware, and the secure operation environment is provided for the terminal device.

In another example, a secure operation environment may be set up for the terminal device based on a Trusted Execution Environment (TEE). For example, a software environment of existing hardware (such as a main chip) in the hardware environment of the terminal device may be improved to set up a trusted execution environment in the software environment. The private key corresponding to the terminal device is stored and maintained in the trusted execution environment, and the secure operation environment is provided for the terminal device.

In a third example, a secure operation environment may be set up for the terminal device based on both SE and TEE. For example, the private key corresponding to the terminal device may be stored and maintained by using SE hardware, and the secure operation environment is provided for the terminal device by using a TEE.

The foregoing embodiments of setting up the secure operation environment for the terminal device are merely examples. In actual applications, the secure operation environment may also be set up for the terminal device by using other implementation means, and the implementation means are not enumerated.

In some embodiments, the terminal device may be added to the blockchain network as a node (which is also referred to as placing a device onto the blockchain), and the private key corresponding to the terminal device is stored and maintained in the secure operation environment set up for the terminal device.

The private key corresponding to the terminal device may be a private key owned by the terminal device, or may be a private key owned by a user of the terminal device. For example, "the private key corresponding to the terminal device" described may be a private key that is generated by a device manufacturer of the terminal device for the terminal device during a device manufacturing stage and is owned by the terminal device; or may be a private key that is generated autonomously by the terminal device for a user when the user uses the terminal device and is owned by the user.

In some embodiments, the private key and the public key owned by the terminal device may be generated by the device manufacturer for the terminal device during the device manufacturing stage, and the device manufacturer may write the private key into the secure operation environment of the terminal device in advance for storage and maintenance. Thus, the private key and the public key owned by the terminal device may not be associated with the identity of a user of the terminal device. Different users of the terminal device can share the same private key written into the secure operation environment of the terminal device by the device manufacturer by default.

In other embodiments, the private key and the public key owned by the terminal device may be generated autonomously by the terminal device for a user of the terminal device, and the terminal device autonomously writes the private key into the secure operation environment of the terminal device. Thus, the private key and the public key autonomously generated by the terminal device may be associated with the identity of a user of the terminal device. Based on identity information of different users, the terminal device may generate a pair of private key and public key for each user, associate the generated private keys with the identity information of the users, and then store and maintain the private keys, the identity information of the users, and association relationships of the private keys and the identity information of the users in the secure operation environment.

For example, during implementation, the manufacturer of the terminal device may write a key generating algorithm into the secure operation environment of the terminal device in advance. When a user of the terminal device uses the terminal device, the terminal device may prompt the user to input identity information for identity authentication. A data type of the identity information input by the user and an identity authentication manner used by the terminal device are not limited. For example, a conventional authentication manner of inputting a password or a token may be used, or an authentication manner based on a physiological feature such as a fingerprint or a human face may be used.

After the terminal device obtains the identity information input by the user, it can be determined whether a private key associated with the identity information is stored in the secure operation environment. If the private key associated with the identity information is not stored in the secure operation environment, it may indicate that the user is a new user using the terminal device for the first time. In this situation, the terminal device can perform identity authentication on the user based on the obtained identity information. If the identity authentication on the user succeeds, the terminal device may invoke the key generating algorithm in the secure operation environment to generate a pair of private key and public key, associate the generated private key with the identity information of the user, and then store and maintain the private key, the identity of the user, and an association relationship between the private key and the identity of the user in the secure operation environment.

In some embodiments, the user may acquire data by using the terminal device, and record the acquired data on the blockchain by using the terminal device.

In some embodiments, the terminal device may store acquired data locally, and record, on the blockchain, a data digest of the acquired data. The terminal device may no longer record original content of the acquired data on the blockchain.

In some embodiments, if the target data acquired by the terminal device is stream data such as video stream data and audio stream data, when recording such stream data on the blockchain, the terminal device may record the stream data in a fragmented manner according to a preset time cycle.

For example, taking video data as an example, the terminal device may use video data in every N minute as a fragment (e.g., N is an integer), compute a data digest of the fragment, then record the data digest of the fragment on the blockchain. In addition, the terminal device may strictly ensure a chronological order of data digests of fragments recorded on the blockchain to facilitate tracing of the data digests and fragments.

In some embodiments, when recording the acquired target data on the blockchain, the terminal device may first compute a data digest of the target data. For example, the data digest may be a hash value of the target data computed based on a hash algorithm. Then, the terminal device may sign the data digest in the secure operation environment based on the private key stored in the secure operation environment.

In some embodiments, device authentication information signed based on a private key owned by a manufacturer of the terminal device may further be stored and maintained in the secure operation environment of the terminal device. For example, the manufacturer of the terminal device may sign the device authentication information based on a private key of the manufacturer during a device manufacturing stage (e.g., to generate a signature of the device authentication information), and then write the signed device authentication information into the secure operation environment for storage and maintenance. The device authentication information may be any form of information that can be used for authenticating the validity of the terminal device. For example, the device authentication information may be a production number of the terminal device, or anti-counterfeit information in other forms.

Before signing the data digest in the secure operation environment based on the private key stored in the secure operation environment, the terminal device may obtain a public key corresponding to the private key owned by the manufacturer of the terminal device, and verify the signature of the device authentication information based on the obtained public key. If the verification succeeds, it can be determined that the terminal device is a valid terminal device manufactured by the manufacturer. Thus, the terminal device further signs the data digest in the secure operation environment based on the private key stored in the secure operation environment.

In this way, validity verification of the terminal device may be introduced before the digest data on the blockchain is signed based on the private key stored in the secure operation environment, to prevent behaviors of storing data onto the blockchain by some invalid devices (for example, a forged device or a maliciously modified invalid device) in time, thereby improving the security level of data to be recorded on the blockchain.

In some embodiments, if the private key stored and maintained in the secure operation environment of the terminal device is a private key that is generated by the device manufacturer for the terminal device in the device manufacturing stage and owned by the terminal device, then an identity authentication mechanism for a user of the terminal device may be initiated to prompt the user to input the user's identity information for identity authentication of the user. After obtaining the identity information input by the user, the terminal device may perform identity authentication on the user based on the obtained identity information. If the identity authentication on the user succeeds (i.e., the identity information of the user is valid), the terminal device may sign the data digest in the secure operation environment based on the private key stored and maintained in the secure operation environment and owned by the terminal device.

In some embodiments, if the private key of the terminal device stored and maintained in the secure operation environment is a private key that is autonomously generated by the terminal device for a user and owned by the user, then an association relationship between the identity information and the private key of the user is stored and maintained in the secure operation environment in advance.

In this situation, after obtaining identity information input by the user, the terminal device may query the association relationship maintained in the secure operation environment to determine whether a private key associated with the identity information is stored in the secure operation environment. If the private key associated with the identity information is stored in the secure operation environment, the terminal device may sign the data digest in the secure operation environment based on the private key.

If the private key associated with the identity information is not stored in the secure operation environment, it may indicate that the user is a new user using the terminal device for the first time. In this situation, the terminal device can perform identity authentication on the user based on identity information of the user. After the identity authentication succeeds, the terminal device invokes a key generating algorithm stored in the secure operation environment to generate a private key and a public key for the user, signs the data digest by using the generated private key, associates the generated private key with the identity information of the user, and then stores and maintains an association relationship between the generated private key and the identity information of the user in the secure operation environment.

In some embodiments, after signing the data digest of the acquired target data in the secure operation environment based on the private key stored in the secure operation environment, the terminal device may submit the signed data digest in the blockchain.

For example, a blockchain-based transaction may be constructed based on the signed data digest, and the transaction is broadcast and spread to other nodes.

After receiving the signed data digest, a node in the blockchain may obtain a public key corresponding to the private key stored in the secure operation environment, and then verify the signature based on the obtained public key. If the signature is verified to be valid, the node can initiate, in the blockchain, consensus processing for the data digest. After the data digest passes the consensus processing, the node packages the data digest into a block to be stored in the blockchain, so as to complete recordkeeping for the data digest.

Different consensus mechanisms may be used by the blockchain. For example, an entity operating the blockchain may select a consensus mechanism flexibly based on an actual requirement.

In some embodiments, when recording the acquired target data on the blockchain, the terminal device may further record description data of the target data along with the data digest of the target data on the blockchain.

For example, when signing the data digest of the target data in the secure operation environment based on the private key stored in the secure operation environment, the terminal device may sign the data digest and the description information of the target data as a whole. That is, the data digest and the description information of the target data are packaged and then signed as a whole, and the signed data digest and description data of the target data are submitted to the blockchain for recordkeeping.

For example, the terminal device may construct a blockchain-based transaction based on the signed data digest and description data of the target data, and broadcast and spread the transaction to other nodes.

Alternatively, when signing the data digest of the target data in the secure operation environment based on the private key stored in the secure operation environment, the terminal device may sign the data digest only, and then submit the description data of the target data and the signed data digest to the blockchain for recordkeeping.

For example, the terminal device may construct a blockchain-based transaction based on the description data of the target data and the signed data digest, and broadcast and spread the transaction to other nodes.

The description information of the target data may include any content. For example, the description information may contain any content related to the target data in actual applications.

In some embodiments, the acquisition time of the data, the acquisition location of the data, and the object related to the acquired data are usually crucial attributes of the data as evidence or proof. Therefore, in some embodiments, the description information of the target data may include one of the acquisition time of the data, the acquisition location of the data, and the object related to the acquired data, or a combination thereof.

In some embodiments, the acquisition time of target data may be a certified authoritative moment (timestamp) obtained from a time certificate authority by interacting with the time certificate authority when the terminal device obtains the target data. The acquisition location of the target data may be a precise acquisition site obtained by invoking, in real time, a positioning module (such as a Global Positioning System (GPS) module) included in the terminal device when the terminal device acquires the target data. The object related to the target data may be a related object manually input by a valid user of the terminal device after the terminal device acquires the target data.

Taking forensic video data of a car accident acquired by a body-worn camera as an example, description information of the video data may include a certified authoritative moment (i.e., acquisition time) obtained from the time certificate authority at the moment when the video data is acquired, a precise acquisition location obtained by the body-worn camera through invoking the positioning module in real time at the moment when the video data is acquired, and vehicle information, driver information, and the like, related to the video data, which are input by a law enforcer.

In some embodiments, after the terminal device finishes recording the data digest of the acquired target data on the blockchain, the node in the blockchain may return, to the terminal device, a notification message (for example, a recordkeeping receipt) indicating that the data digest of the target data has been recorded on the blockchain.

The notification message may include description information related to recordkeeping of the data digest of the target data on the blockchain. For example, the notification message may include a transaction ID of the transaction in which the data digest of the target data is used, the number of a block where the data digest of the target data is located, and the like.

Subsequently, the data submitter may submit the original content of the target data stored locally on the terminal device to a data verification party as proof or evidence.

The data submitter may be a user of the terminal device (for example, a data collector), or may be a third-party user having the authority to use the data locally stored in the terminal device. Alternatively, the data submitter may be other individual or entities submitting the data as proof or evidence. The data verification party may be an individual, entity, or authority department using and verifying the data as the proof or evidence.

For example, if the terminal device is an event data recorder, when a vehicle of a user has a car accident and the user is to file a claim with an insurance company, the user may submit video data acquired by the event data recorder during driving of the vehicle to the insurance company as an evidence document. The insurance company may verify the validity of the evidence document, and decide, based on a validity verification result of the evidence document, whether to settle the claim of the user.

In another example, if the terminal device is a body worn camera, when a law enforcer collects proof or evidence in cooperation with a judicial institution, video data of a law enforcement process acquired by the body worn camera during the law enforcement process may be submitted to the judicial institution as an evidence document. The judicial institution may verify the validity of the evidence document, and decide, based on a validity verification result of the evidence document, whether the evidence document can be used for judicial purposes.

In some embodiments, after the data verification party obtains the target data submitted by the data provider/submitter, because the terminal device has recorded the data digest of the target data on the blockchain, the data verification party can re-compute a data digest of the target data submitted by the data provider, and determine whether the re-computed data digest matches the data digest of the target data recorded on the blockchain, so as to verify the validity of the target data submitted by the data submitter.

In some embodiments, when determining whether the re-computed data digest matches the data digest of the target data which has been recorded on the blockchain, the data verification party may first obtain a data digest of the target data which has been recorded on the blockchain.

For example, the data submitter may submit, to the data verification party, the transaction ID of the transaction in which the data digest of the target data is used and the number of the block where the data digest of the target data is located (for example, information include in the recordkeeping receipt). The data verification party may search for the data digest of the target data in the blocks of the blockchain by using the transaction ID of the transaction in which the data digest of the target data is used and the block number as query indexes.

After obtaining the data digest of the target data which has been recorded on the blockchain, the data verification party may compare the re-computed data digest with the data digest of the target data which has been recorded on the blockchain to determine whether the two data digests are the same. If the two data digests are the same, it can be determined that the re-computed data digest matches the data digest of the target data which has been recorded on the blockchain; and if the two data digests are different, it can be determined that the re-computed data digest does not match the data digest of the target data which has been recorded on the blockchain.

In other embodiments, the data verification party may determine whether the re-computed data digest matches the data digest of the target data which has been recorded on the blockchain, without obtaining the data digest of the target data which has been recorded on the blockchain.

For example, the data verification party may apply a verification algorithm. The verification algorithm is used for verifying whether a computed data digest has been recorded on the blockchain. The data verification party may execute the verification algorithm, and based on an execution result of the verification algorithm (where, for example, the execution result is usually true or false), verify whether the computed data digest has been recorded on the blockchain.

If the execution result of the verification algorithm indicates that the computed data digest has been recorded on the blockchain, then it can be determined that the computed data digest matches the data digest of the target data which has been recorded on the blockchain; if the execution result of the verification algorithm indicates that the computed data digest has not been recorded on the blockchain, it can be determined that the computed data digest does not match the data digest of the target data which has been recorded on the blockchain.

In some embodiments, when the data verification party determines, through verification, that the computed data digest does not match the data digest of the target data which has been recorded on the blockchain, it can be determined that the target data submitted by the data submitter is invalid data. On the contrary, when the data verification party determines, through verification, that the computed data digest matches the data digest of the target data which has been recorded on the blockchain, it can be determined that the target data submitted by the data submitter is valid data.

In some embodiments, in the recordkeeping stage, if the terminal device records the description data of the target data along with the data digest of the target data on the blockchain, the data submitter may also submit the description data of the target data to the data verification party along with the data digest of the target data.

Thus, when determining, through the foregoing validity verification processes, that the data digest of the target data submitted by the data submitter matches the data digest of the target data which has been recorded on the blockchain, the data verification party may further determine whether the description data of the target data submitted by the data provider matches the description data of the target data which has been recorded on the blockchain.

For example, the data verification party may separately verify whether an acquisition time of the target data, an acquisition location of the target data, and an object related to the target data that are submitted by the data submitter match an acquisition time of the target data, an acquisition location of the target data, and an object related to the target data that are recorded on the blockchain.

If the verification succeeds, it is determined that the description data of the target data submitted by the data provider matches the description data of the target data which has been recorded on the blockchain, and then it is determined that the target data submitted by the data submitter is valid data. On the contrary, if it is determined, through the verification, that the description data of the target data submitted by the data provider does not match the description data of the target data which has been recorded on the blockchain, then it can be determined that the target data submitted by the data submitter is invalid data.

In this way, the verification of whether the description data of the target data submitted by the data provider matches the description data of the target data which has been recorded on the blockchain can be further introduced into the validation verification process described in the foregoing embodiments. It is determined that the target data submitted by the data submitter/provider is valid data when the data digest and the description data of the target data submitted by the data provider match the data digest and the description data of the target data which are recorded on the blockchain. Therefore, the error rate during validity verification can be reduced.

For example, if the target data is video data, the data provider may forge information of an acquisition time, or an acquisition location of the video data, or an object data related to the video data, and then submit the forged information along with the video data to the data verification party as proof or evidence. Therefore, by introducing the verification of whether the description data of the target data submitted by the data provider matches the description data of the target data recorded on the blockchain into the validation verification process described in the foregoing embodiments, such situations can be detected in time and prevented, thereby minimizing the probability of determining the video data as valid data.

In one aspect, by improving the process of recordkeeping on the blockchain, the terminal device may no longer need to record original content of acquired data on the blockchain. Instead, the terminal device may locally store the original content of the acquired data, and records a data digest of the original content on the blockchain, so that the terminal device can be used as a hub between a physical world and a world on the blockchain, and the acquired data is recorded on the blockchain more conveniently.

In another aspect, for a data verification party that obtains data acquired by the terminal device, the data verification party can conveniently verify the validity of the obtained data by matching a data digest of the obtained data with a data digest of the data which has been recorded on the blockchain. Therefore, the data acquired by the terminal device can be submitted to the data verification party as proof or evidence, greatly improving the usability of the data acquired by the terminal device.

For example, when a user submits stream data acquired by a body worn camera or an event data recorder to a third-party institution (such as a judicial institution or an insurance company) as proof or evidence, the third-party institution may only need to re-compute a data digest of the obtained data and match the data digest of the data with the data digest of the data which has been recorded on the blockchain, thereby conveniently verifying the validity of the obtained data. In this way, usability of data acquired by the body worn camera or the event data recorder as valid proof or evidence can be significantly improved.

Figure 2:
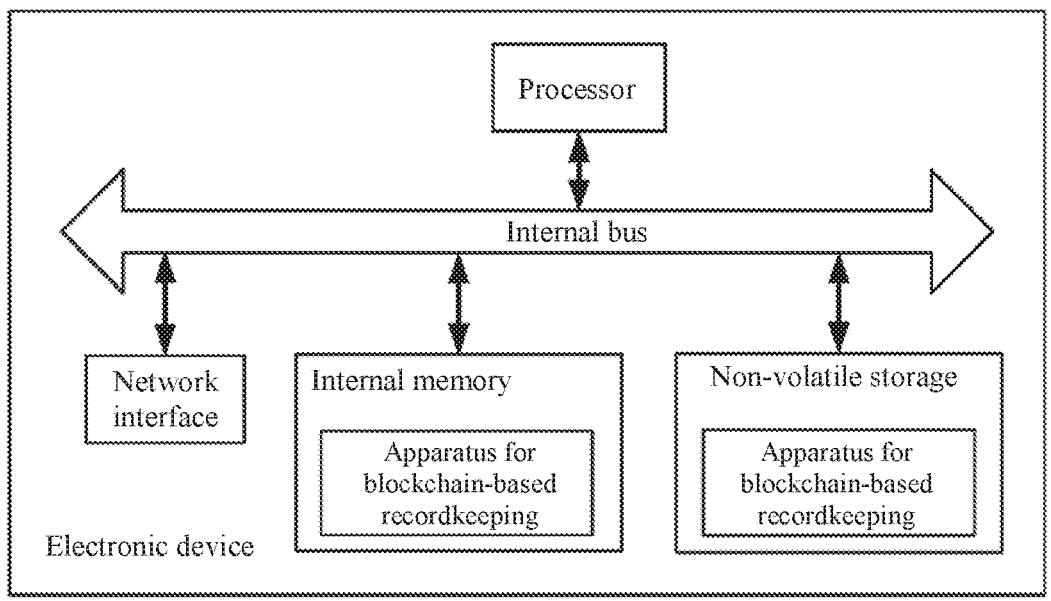
FIG. 2 is a schematic structural diagram of an electronic device for blockchain-based recordkeeping according to some embodiments.

Similar to the foregoing method embodiments, this specification further provides some embodiments of an apparatus for blockchain-based recordkeeping. The embodiments of the apparatus for blockchain-based recordkeeping in this specification may be applied to an electronic device. The apparatus embodiments may be implemented by software, hardware, or a combination of software and hardware. Taking software implementation as an example, at a logical level, the apparatus is formed in the following manner: a processor of the electronic device where the apparatus is located reads corresponding computer program instructions in a non-volatile storage into an internal memory and executes the computer program instructions. At a hardware level, FIG. 2 is a structural diagram of hardware of an electronic device where the apparatus for blockchain-based recordkeeping according to this specification is located. In addition to a processor, an internal memory, a network interface, and a non-volatile storage shown in FIG. 2, the electronic device where the apparatus is located usually may further include other hardware according to actual functions of the electronic device, and details are not described herein.

Figure 3:
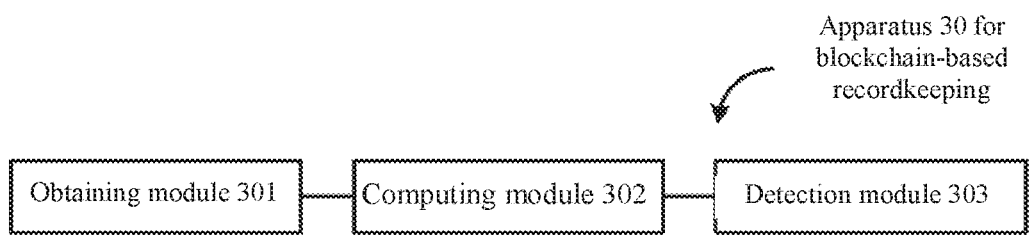
FIG. 3 is a block diagram of an apparatus for blockchain-based recordkeeping according to some embodiments.

Referring to FIG. 3, FIG. 3 is a block diagram of an apparatus for blockchain-based recordkeeping according to some embodiments. The apparatus 30 for blockchain-based recordkeeping may be applied to the electronic device shown in FIG. 2. For example, the electronic device in FIG. 2 is a terminal device. The apparatus 30 may include: an obtaining module 301, a computing module 302, and a detection module 303.

The obtaining module 301 is configured to obtain target data submitted by a data submitter. The computing module 302 is configured to compute a data digest of the target data, and determine whether the computed data digest matches the data digest of the target data which has been recorded on the blockchain. The detection module 303 is configured to determine that the target data submitted by the data submitter is valid in response to that the computing module 302 determines the computed data digest matches the data digest of the target data which has been recorded on the blockchain; and determine that the target data submitted by the data submitter is invalid in response to that the computing module 302 determines that the computed data digest does not match the data digest of the target data which has been recorded on the blockchain.

In some embodiments, the terminal device includes a secure operation environment, and a private key corresponding to the terminal device is stored in the secure operation environment; the obtaining module 301 is further configured to: obtain a data digest of the target data submitted by the terminal device to the blockchain, the data digest being signed in the secure operation environment based on the private key of the terminal device; and the apparatus 30 further includes: a recordkeeping module 304 (not shown in FIG. 3), configured to verify the signature of the data digest based on a public key corresponding to the private key, and record the data digest of the target data in the blockchain in response to the signature being verified to be valid.

In some embodiments, the detection module 303 is configured to: verify, based on a preset verification algorithm, whether the computed data digest has been recorded in the blockchain; determine that the computed data digest matches the data digest of the target data which has been recorded on the blockchain in response to that it is verified that the computed data digest has been recorded in the blockchain; and determine that the computed data digest does not match the data digest of the target data which has been recorded on the blockchain in response to that it is verified that the computed data digest is not recorded in the blockchain.

In some embodiments, the detection module 303 is configured to: obtain a data digest of the target data which has been recorded in the blockchain; determine whether the obtained data digest of the target data is the same as the computed data digest; and determine that the computed data digest matches the data digest of the target data which has been recorded on the blockchain in response to determining that the obtained data digest of the target data is the same as the computed data digest; and determine that the computed data digest does not match the data digest of the target data which has been recorded on the blockchain in response to determining that the obtained data digest of the target data is different from the computed data digest.

In some embodiments, description data of the target data is further recorded in the blockchain; and the detection module 303 is further configured to: in response to determining that the computed data digest matches the data digest of the target data which has been recorded on the blockchain, determine whether description data of the target data submitted by the data provider matches the description data of the target data recorded on the blockchain; and determine that the target data submitted by the data submitter is valid in response to determining that the description data of the target data submitted by the data provider matches the description data of the target data recorded on the blockchain.

In some embodiments, the description data includes: an acquisition time of the target data, an acquisition location of the target data, or an object related to the target data, or a combination thereof.

In some embodiments, the terminal device includes a body worn camera or an event data recorder. In addition, the target data includes video data, audio data, or image data, or a combination thereof, that are acquired by the body worn camera or the event data recorder as evidence or proof.

For details of the implementation of the functions and effects of each module in the foregoing apparatus, refer to the implementation of the corresponding steps in the foregoing methods. Details are not described herein again.

The apparatus embodiments are similar to the method embodiments. Therefore, for related parts, reference may be made to the descriptions in the method embodiments. The described apparatus embodiments is merely schematic. The modules described as separate parts may or may not be physically separate, and the parts displayed as modules may or may not be physical modules, may be located in one position, or may be distributed on multiple network modules. Some or all of the modules may be selected according to actual needs to achieve the objectives of this specification. Those of ordinary skill in the art can understand and implement this specification without creative efforts.

The systems, apparatus or modules illustrated in the foregoing embodiments may be implemented by a computer chip or an entity, or implemented by a product having some function. A typical implementation device may be a computing device, and examples of the computing device may include a personal computer, a laptop computer, a cellular phone, a camera phone, a smartphone, a personal digital assistant, a media player, a navigation device, an email sending and receiving device, a game console, a tablet computer, or a wearable device, or a combination of any of these devices.

Similar to the foregoing method embodiments, this specification further provides embodiments of an electronic device. The electronic device includes: a processor and a memory configured to store machine executable instructions. The processor and the memory are usually interconnected through an internal bus. In other embodiments, the device may further include an external interface, so as to be able to communicate with other devices or components.

In some embodiments, by reading and executing machine executable instructions stored in the memory and corresponding to control logic for blockchain-based recordkeeping, the processor is caused to: obtain target data submitted by a data submitter; compute a data digest of the target data, and determine whether the computed data digest matches the data digest of the target data which has been recorded on the blockchain; and determine that the target data submitted by the data submitter is valid in response to determining that the computed data digest matches the data digest of the target data which has been recorded on the blockchain; and determine that the target data submitted by the data submitter is invalid in response to determining that the computed data digest does not match the data digest of the target data which has been recorded on the blockchain.

In some embodiments, the terminal device includes a secure operation environment, and a private key corresponding to the terminal device is stored in the secure operation environment; and by reading and executing machine executable instructions stored in the memory and corresponding to control logic for blockchain-based recordkeeping, the processor is caused to: obtain a data digest of the target data submitted by the terminal device to the blockchain, the data digest being signed in the secure operation environment based on the private key corresponding to the terminal device to generate a signature; verify the signature of the data digest based on a public key corresponding to the private key; and record the data digest of the target data in the blockchain in response to the signature being verified to be valid.

In some embodiments, by reading and executing machine executable instructions stored in the memory and corresponding to control logic for blockchain-based recordkeeping, the processor is caused to: verify, based on a preset verification algorithm, whether the computed data digest has been recorded in the blockchain; determine that the computed data digest matches the data digest of the target data which has been recorded on the blockchain in response to that it is verified that the data digest has been recorded in the blockchain; and determine that the computed data digest does not match the data digest of the target data which has been recorded on the blockchain in response to that it is verified that the data digest is not recorded in the blockchain.

In some embodiments, by reading and executing machine executable instructions stored in the memory and corresponding to control logic for blockchain-based recordkeeping, the processor is caused to: obtain a data digest of the target data which has been recorded in the blockchain; determine whether the obtained data digest of the target data is the same as the computed data digest; and determine that the computed data digest matches the data digest of the target data which has been recorded on the blockchain in response to determining that the obtained data digest of the target data is the same as the computed data digest; and determine that the computed data digest does not match the data digest of the target data which has been recorded on the blockchain in response to determining that the obtained data digest of the target data is different from the computed data digest.

In some embodiments, description data of the target data is further recorded in the blockchain; and by reading and executing machine executable instructions stored in the memory and corresponding to control logic for blockchain-based recordkeeping, the processor is caused to: in response to determining that the computed data digest matches the data digest of the target data which has been recorded on the blockchain, determine whether description data of the target data submitted by the data provider matches the description data of the target data which has been recorded on the blockchain; and determine that the target data submitted by the data submitter is valid in response to determining that the description data of the target data submitted by the data provider matches the description data of the target data which has been recorded on the blockchain.

Other embodiments of this specification will be obvious to those skilled in the art based on the specification disclosed herein. This specification is intended to cover any variations, uses, or adaptations of the embodiments following the general principles thereof and including such departures from this specification as come within known or customary practice in the art. The specification and examples are intended to be exemplary, with a scope and spirit of this specification being indicated by the following claims.

It will be appreciated that this specification is not limited to the exact constructions that have been described above and illustrated in the accompanying drawings. Various modifications and changes can be made without departing from the scope thereof. It is intended that the scope of this specification be limited by the appended claims.

The foregoing descriptions are some embodiments of this specification, and are not intended to limit this specification. Any modification, equivalent replacement, or improvement made within the spirit and principle of this specification shall fall within the protection scope of this specification.

What is claimed is:

1. A method, comprising:
   capturing, at a device, a data stream, wherein the data stream comprises a video stream or an audio stream;
   applying, at the device, a hash algorithm to each of a plurality of fragments of the data stream to respectively generate a plurality of hash values, each of the hash values corresponding to one of the plurality of fragments;
   obtaining, at the device, an acquisition timestamp of each of the fragments;
   recording description data of each of the fragments of the data stream;
   for each of the hash values, digitally signing as a whole, in a trusted execution environment (TEE) of the device, the hash value and the description data of the fragment corresponding to the hash value by using a private key stored in the TEE to generate a signature;
   generating, at the device, a plurality of blockchain transactions each comprising a respective one of the hash values and the description data of the fragment corresponding to the respective one of the hash values, the signature generated from digitally signing the hash value and the description data of the fragment corresponding to the hash value, and the acquisition timestamp of the fragment associated with the hash value of the blockchain transaction; and
   transmitting, by the device, the plurality of blockchain transactions to a blockchain network for consensus verification of the plurality of blockchain transactions and storage of the plurality of hash values and the description data of the fragments corresponding to the hash values, to a blockchain on the blockchain network.

2. The method of claim 1, before digitally signing each of the hash values, further comprising:
   obtaining, at the device, identity information input by a user of the device; and
   determining, at the device, if a private key associated with the identity information is stored in the TEE.

3. The method of claim 2, further comprising: in response to determining that there is no private key associated with the identity information:
   authenticating, at the device, the user based on the identity information;
   invoking, at the device, a key generating algorithm in the TEE to generate a private key associated with the user; and
   storing the private key, the identity information of the user, and an association relationship between the private key and the identity information of the user in the TEE.

4. The method of claim 1, further comprising: obtaining, at the device, an acquisition location of each of the fragments, wherein each of the blockchain transactions further comprises the acquisition location of the fragment associated with the hash value of the blockchain transaction.

5. The method of claim 1, further comprising: receiving, at the device, a notification message from a node on the blockchain network, the notification message identifying a location on the blockchain where a hash value associated with one of the transactions is stored.

6. The method of claim 1, wherein the plurality of fragments are captured in a chronological order, wherein submitting the transactions to the blockchain network comprises: submitting the plurality of transactions to the blockchain network such that the plurality of hash values are stored on the blockchain in the chronological order.

7. The method of claim 1, further comprising:
   storing in the TEE, at the device, device authentication information signed by a private key associated with a manufacturer of the device;
   obtaining, at the device, a public key corresponding to the private key associated with the manufacturer; and
   prior to digitally signing each of the hash values, verifying, at the device, based on the public key, a signature of the device authentication information to determine that the device is valid.

8. A device comprising: one or more processors and one or more non-transitory computer-readable mediums coupled to the one or more processors and configured with instructions executable by the one or more processors to cause the device to perform operations comprising:
   capturing a data stream, wherein the data stream comprises a video stream or an audio stream;
   applying a hash algorithm to each of a plurality of fragments of the data stream to respectively generate a plurality of hash values, each of the hash values corresponding to one of the plurality of fragments; and
   obtaining an acquisition timestamp of each of the fragments;
   recording description data of each of the fragments of the data stream;
   for each of the hash values, digitally signing as a whole, in a trusted execution environment (TEE) of the device, the hash value and the description data of the fragment corresponding to the hash value by using a private key stored in the TEE to generate a signature;
   generating a plurality of blockchain transactions each comprising a respective one of the hash values and the description data of the fragment corresponding to the respective one of the hash values, the signature generated from digitally signing the hash value and the description data of the fragments corresponding to the hash values, and the acquisition timestamp of the fragment associated with the hash value of the blockchain transaction; and
   transmitting the plurality of blockchain transactions to a blockchain network for consensus verification of the plurality of blockchain transactions and storage of the plurality of hash values and the description data of the fragment corresponding to the hash value, to a blockchain on the blockchain network.

9. The device of claim 8, wherein the operations further comprise: before digitally signing each of the hash values:
   obtaining identity information input by a user of the device; and
   determining if a private key associated with the identity information is stored in the TEE.

10. The device of claim 9, wherein the operations further comprise: in response to determining that there is no private key associated with the identity information:

authenticating the user based on the identity information;

invoking a key generating algorithm in the TEE to generate a private key associated with the user; and storing the private key, the identity information of the user, and an association relationship between the private key and the identity information of the user in the TEE.

11. The device of claim 8, wherein the operations further comprise: obtaining an acquisition location of each of the fragments, wherein each of the blockchain transactions further comprises the acquisition location of the fragment associated with the hash value of the blockchain transaction.

12. The device of claim 8, wherein the operations further comprise: receiving a notification message from a node on the blockchain network, the notification message identifying a location on the blockchain where a hash value associated with one of the transactions is stored.

13. The device of claim 8, wherein the plurality of fragments are captured in a chronological order, wherein submitting the transactions to the blockchain network comprises: submitting the plurality of transactions to the blockchain network such that the plurality of hash values are stored on the blockchain in the chronological order.

14. The device of claim 8, wherein the operations further comprise:

storing in the TEE device authentication information signed by a private key associated with a manufacturer of the device;

obtaining a public key corresponding to the private key associated with the manufacturer; and prior to digitally signing each of the hash values, verifying, based on the public key, a signature of the device authentication information to determine that the device is valid.

15. A non-transitory computer-readable storage medium storing instructions that, when executed by a processor, cause a device to perform operations comprising:

capturing a data stream, wherein the data stream comprises a video stream or an audio stream;

applying a hash algorithm to each of a plurality of fragments of the data stream to respectively generate a plurality of hash values, each of the hash values corresponding to one of the plurality of fragments; and obtaining an acquisition timestamp of each of the fragments;

recording description data of each of the fragments of the data stream;

for each of the hash values, digitally signing as a whole, in a trusted execution environment (TEE) of the device, the hash value and the description data of the fragment corresponding to the hash value by using a private key stored in the TEE to generate a signature;

generating a plurality of blockchain transactions each comprising a respective one of the hash values and the description data of the fragment corresponding to the respective one of the hash values, the signature generated from digitally signing the hash value and the description data of the fragment corresponding to the hash value, and the acquisition timestamp of the fragment associated with the hash value of the blockchain transaction; and transmitting the plurality of blockchain transactions to a blockchain network for consensus verification of the plurality of blockchain transactions and storage of the plurality of hash values and the description data of the fragments corresponding to the hash values, to a blockchain on the blockchain network.

16. The non-transitory computer-readable storage medium of claim 15, wherein the operations further comprise: before digitally signing each of the hash values:

obtaining identity information input by a user of the device; and determining if a private key associated with the identity information is stored in the TEE.

17. The non-transitory computer-readable storage medium of claim 16, wherein the operations further comprise: in response to determining that there is no private key associated with the identity information:

authenticating, at the device, the user based on the identity information;

invoking, at the device, a key generating algorithm in the TEE to generate a private key associated with the user; and storing the private key, the identity information of the user, and an association relationship between the private key and the identity information of the user in the TEE.

18. The non-transitory computer-readable storage medium of claim 15, wherein the operations further comprise: obtaining, at the device, an acquisition location of each of the fragments, wherein each of the blockchain transactions further comprises the acquisition location of the fragment associated with the hash value of the blockchain transaction.

19. The non-transitory computer-readable storage medium of claim 15, wherein the operations further comprise: receiving, at the device, a notification message from a node on the blockchain network, the notification message identifying a location on the blockchain where a hash value associated with one of the transactions is stored.

20. The non-transitory computer-readable storage medium of claim 15, wherein the plurality of fragments are captured in a chronological order, wherein submitting the transactions to the blockchain network comprises: submitting the plurality of transactions to the blockchain network such that the plurality of hash values are stored on the blockchain in the chronological order.

* * * * *